United States Patent [19]
Hernqvist

[11] 3,760,296
[45] Sept. 18, 1973

[54] INTERNALLY-MODULATED GAS LASER

[75] Inventor: Karl Gerhard Hernqvist, Princeton, N.J.

[73] Assignee: RCA Corporation, New York, N.Y.

[22] Filed: June 26, 1972

[21] Appl. No.: 266,074

[52] U.S. Cl. .............................................. 331/94.5
[51] Int. Cl. ............................................... H01s 3/10
[58] Field of Search ................................... 331/94.5

[56] References Cited
UNITED STATES PATENTS
3,321,714   5/1967   Tien ................................... 331/94.5
3,696,309   10/1972   Ward ................................. 331/94.5

*Primary Examiner*—William L. Sikes
*Attorney*—Edward J. Norton, George J. Seligsohn, Glenn H. Bruestle and Irwin M. Krittman

[57] ABSTRACT

An internally-modulated gas laser employing a first discharge tube for generating laser wave energy in which modulation is effected by a second discharge tube which includes solely two electrodes, one of which is a cold cathode and the other of which is an anode. Preferably the first and second discharge tubes and the optical resonant cavity mirrors are physically attached to one another to provide a single unitary structure.

8 Claims, 1 Drawing Figure

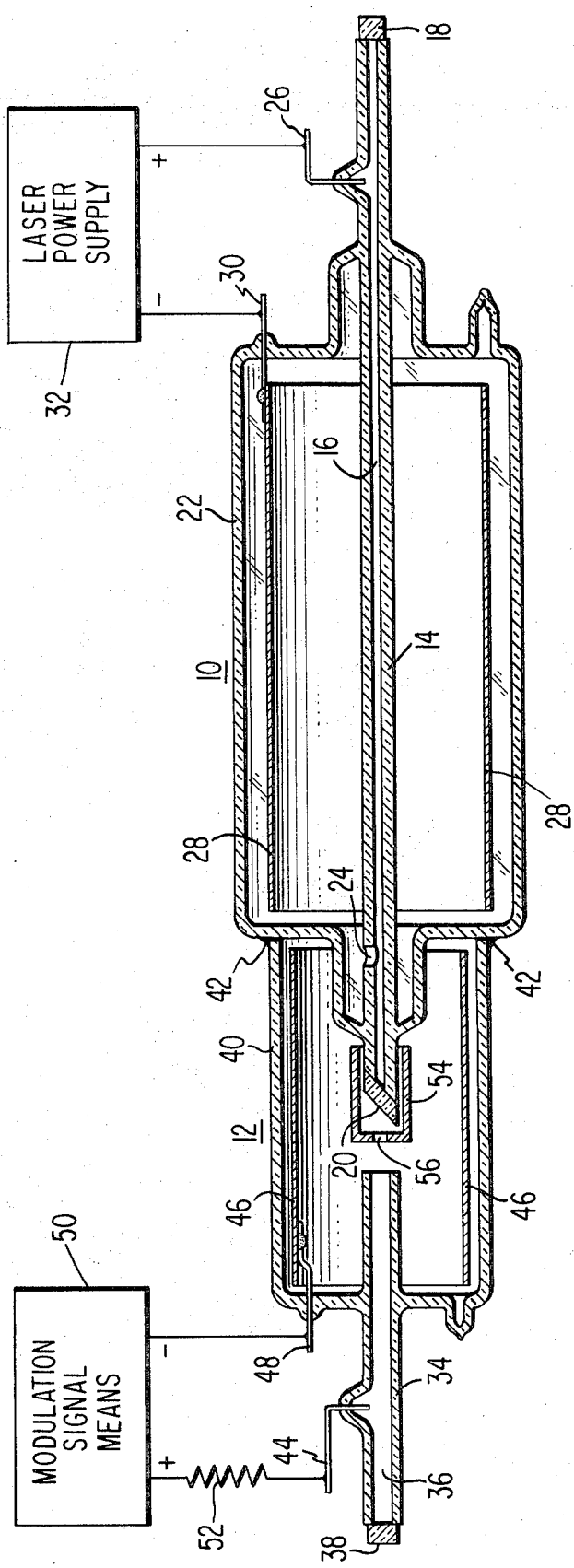

INTERNALLY-MODULATED GAS LASER

This invention relates to internally-modulated gas lasers and, more particularly, to such lasers employing a gas discharge of variable intensity to effect modulation.

As is known, internal modulation of a laser may be achieved by placing an appropriate modulating-signal-responsive device within an optical resonant cavity in serial relationship with the active lasing medium. Among such modulating-signal-responsive devices are electro-optic crystals, acousto-optic devices, and a gas tube filled with a gas which is responsive to a discharge therethrough for absorbing a proportion of wave energy of the lasing wavelength propagated therethrough in accordance with the intensity of the discharge therethrough. The present invention is concerned with the latter.

Reference is made to U.S. Pat. No. 3,321,714, issued May 23, 1967 to P. K. Tien, which discloses a light modulating system composed of an internally-modulated gas laser of the type comprising first and second reflectors defining a cavity optically resonant at a given wavelength, and first and second gas-filled discharge tubes located between the reflectors and oriented in serial relation along the length of the cavity. The first discharge tube is filled with a first gas responsive to a given discharge therethrough for generating wave energy at the given wavelength by stimulated emission and the second discharge tube is filled with a second gas responsive to a discharge therethrough for absorbing a proportion of wave energy of the given wavelength propagating therethrough in accordance with the intensity of the discharge therethrough.

As shown in FIG. 1 of the aforesaid Tien U.S. Pat. No. 3,321,714, the first discharge tube, which generates wave energy by stimulated emission, is tube 12 and the second tube, which absorbs a proportion of wave energy propagated therethrough, is tube 22. The second tube 22 is a triode incorporating hot cathode 26, grid 27, and anode 28. Second tube 22 also includes filament 29 for heating hot cathode 26. Tubes 12 and 22, as shown in FIG. 1 of U.S. Pat. No. 3,321,714, are two distinct, physically detached tubes which are separated from each other.

The present invention is directed to an improvement in a light modulating system of the type shown in the aforesaid Tien U.S. Pat. No. 3,321,714. This improvement consists of employing a second discharge tube which includes solely two electrodes, one of which is a cold cathode and the other of which is an anode, thereby providing a tube capable of much longer life than a triode employing a hot cathode. Among the advantages of a cold cathode over a hot cathode are (1) no warm-up delay; (2) no thermal distortion of cavity by heat from cathode, and (3) no heater filament power supply. Also, the first and second discharge tubes and the first and second reflectors defining the laser optical resonant cavity are preferably physically attached to one another to provide an internally-modulated gas laser consisting of a single, unitary structure. This, together with its long life, provides a commercially viable internally-modulated gas laser because it is simple, long-lasting, and can be manufactured at relatively low cost.

These and other features and advantages of the present invention will become more apparent from the following detailed description, taken together with the accompanying drawing, in which the sole figure shows a preferred embodiment of the present invention.

The internally-modulated gas laser shown in the drawing consists of a first discharge tube 10 and a second discharge tube 12. The first discharge tube 10 consists of capillary 14 which defines an axially disposed bore 16. Attached to the right end of capillary 14 and sealing the right end of bore 16 is first mirror 18. Attached to the left end of capillary 14 and sealing the left end of bore 16 is Brewster window 20. Bulb 22 surrounds capillary 14 and has its respective left and right ends physically attached to the outside of capillary 14, as shown in the drawing. Aperture 24, located in the wall of capillary 14 at a point towards Brewster window 20, provides communication between bore 16 and the interior of bulb 22. Both bore 16 and the interior of bulb 24 are filled with a lasing gas, such as a mixture of helium and neon.

Anode 26 is connected through the wall of capillary 14 to a point of bore 16 located intermediate the right end of bulb 22 and first mirror 18. Cylindrical cold cathode 28 is oriented substantially coaxial with bore 16 in spaced, surrounding relationship with respect to a portion of the length of capillary 14. Cold cathode 28 is connected to the outside through the wall of the bulb 22 by pin 30. Laser power supply 32, which has its positive terminal connected to anode 26 and its negative terminal connected to cathode pin 30, establishes a given discharge through the gas filling first tube 10 which generates wave energy at a given wavelength by stimulated emission.

Second tube 12 includes second capillary 34 defining second bore 36, which is symmetrical about the same axis as bore 16. As shown, second capillary 34 is longitudinally disposed in colinear serial relationship with capillary 14 with the right end of second capillary 34, which is open, being situated in proximate spaced relationship with Brewster window 20, as shown. The left end of second capillary 34 has second mirror 38 attached thereto for sealing the left end of second bore 36. A second bulb 40 has the right end thereof attached to the left end of bulb 22 of first tube 10 by an epoxy seal 42. The left end of second bulb 40 is attached to the outside of second capillary 34 at a point thereof intermediate the ends thereof. Anode 44 extends through the wall of the capillary 44 to a point in bore 36 intermediate the left end of second bulb 40 and second mirror 38. Located within the interior of bulb 40 is second cylindrical cold cathode 46 which is oriented substantially coaxial with second bore 36 in spaced, surrounding relationship with respect to a portion of the length of second capillary 34. Second cold cathode 46 is connected to the outside of second bulb 40 by pin 48.

Second bore 36 and the interior of second bulb 40 are filled with a gas, such as neon at a pressure of 10 Torr, which is responsive to a discharge therethrough for absorbing a proportion of wave energy of the given wavelength generated by first tube 10 propagating therethrough in accordance with the intensity of the discharge therethrough. The discharge in bore 36 and the interior of bulb 40 is established and the intensity thereof is controlled by modulation signal means 50, which has its negative terminal directly connected to cathode 48 and its positive terminal connected to anode 44 through voltage-dropping resistance 52. The intensity of the discharge through bore 36 and the interior of bulb 40 is controlled by modulation signal means 50 over a range which continuously extends from a first intensity at which the discharge is substantially transparent to wave energy at the given wavelength generated by tube 10 to a second intensity at which the discharge is substantially opaque to wave energy at this given wavelength. In an experimental case, when the gas filling first tube 10 was a mixture of helium and neon, and the gas filling tube 12 was substantially entirely neon at a pressure on the order of 10 Torr, the first intensity turned out to be in the order of 1 milliampere and a second intensity turned out to be in the order of 8 milliamperes.

Protective sleeve 54, which surrounds Brewster window 20, protects Brewster window 20 from the effects of the gas discharge taking place in the interior of bulb 40. As shown in the drawing, protective sleeve 54 slides over the left end of capillary 14 and is supported thereby. In practice, sleeve 20 is cemented to the outside of the left end of capillary 14 by a layer of epoxy. However, for the sake of clarity in the drawing, this layer of epoxy is not specifically shown.

First mirror 18 and second mirror 38 are oriented with respect to each other to define an optical resonant cavity through bore 16 of first tube 10, Brewster window 20, aperture 56 in protective sleeve 54 and bore 36, as shown in the drawing. First mirror 18 is preferably a substantially totally reflective spherical confocal mirror (having a radius of about 30 centimeters by way of example), while second mirror 38 is preferably a partially transmissive flat mirror for obtaining a laser light output therefrom.

In operation, the voltage across anode 44 and cathode 46 is relatively independent of the amplitude of the modulation signal applied by modulation signal means 50. However, the discharge current intensity of the discharge between anode 44 and cathode 46 varies in accordance with the amplitude of the modulation signal from modulation signal means 50. Thus, as the amplitude of the modulation signal from modulation signal means 50 increases, the voltage drop across resistance 52 (which may be about 20-kilohms by way of example) increases and vice versa. The output from the laser is a maximum when a discharge taking place in tube 12 is relatively transparent to wave energy of the given wavelength generated by first tube 10. This takes place when the amplitude of the modulation signal and hence the intensity of the discharge current through second tube 12 is a minimum. No output is obtained when the discharge in second tube 12 is relatively opaque to wave energy of a given wavelength generated by tube 10. This takes place when the amplitude of the modulation signal and hence the intensity of the discharge current through second tube 12 is a maximum. In the range between the minimum and maximum values of discharge current through second tube 12, the output has an intermediate level which is a single-valued function of the amplitude of the modulation signal from modulation signal means 50. Therefore, the internally modulated laser shown in the drawing is capable of providing a modulated light output in accordance with an analog modulating signal from modulation signal means 50.

What is claimed is:

1. In an internally-modulated gas laser of the type comprising first and second reflectors defining a cavity optically resonant at a given wavelength, and first and second gas-filled discharge tubes located between said reflectors and oriented in serial relationship along the length of said cavity, said first discharge tube being filled with a first gas responsive to a given discharge therethrough for generating wave energy at said given wavelength by stimulated emission and said second discharge tube being filled with a second gas responsive to a discharge therethrough for absorbing a proportion of wave energy of said given wavelength propagating therethrough in accordance with the intensity of said discharge therethrough; the improvement wherein said second discharge tube includes solely two electrodes for establishing and controlling said discharge in said second gas, a first of said two electrodes consisting of a cold cathode and the second of said two electrodes consisting of an anode in spaced relationship with respect to said cold cathode.

2. The gas laser defined in claim 1, wherein said first gas is a mixture of helium and neon and said second gas is substantially entirely neon at a pressure in the order of 10 Torr.

3. The gas laser defined in claim 1, wherein said first and second mirrors and said first and second tubes are fixedly attached to each other to provide a single unitary structure.

4. The gas laser defined in claim 3, wherein said first discharge tube includes a single capillary of a given length and diameter defining a bore symmetrical about a given longitudinal axis, a first end of said capillary being terminated by said first mirror attached thereto for sealing one end of said bore, a bulb surrounding said capillary and attached at opposite ends of said bulb to the outside of said capillary, an anode electrode situated in said bore at a point thereof intermediate said first mirror and the end of said bulb proximate thereto, a cylindrical cold cathode substantially coaxial with said bore disposed within said bulb in spaced surrounding relationship with respect to a portion of the length of said capillary, a Brewster window attached to and terminating a second end of said capillary for sealing the other end of said bore, and said capillary having an aperture therein located toward said second end thereof for providing communication between said bore and the interior of said bulb, and wherein said second tube includes a second capillary of a second given length and diameter defining a second bore symmetrical about said axis, said second capillary being longitudinally disposed in colinear serial relationship with said first-mentioned capillary with one end of said second capillary which is open being situated in proximate spaced relationship with said Brewster window, said other end of said second capillary being terminated by said second mirror attached thereto for sealing that end of said second bore, a second bulb having one end thereof attached to the outside of said first-mentioned bulb and the other end thereof attached to the outside of said second capillary at a point thereof intermediate the ends thereof, an anode in said second bore at a point thereof intermediate the other end of said second bulb and said second mirror, and a second cylindrical cold cathode substantially coaxial with said second bore in spaced, surrounding relationship with respect to a portion of the length of said second capillary.

5. The gas laser defined in claim 1, wherein said Brewster window and a portion of said first-mentioned capillary extends into said second tube, wherein said second cathode is disposed in spaced, surrounding relationship with respect to a portion of the length of said first-mentioned capillary, and wherein said gas laser further includes a protective sleeve member disposed within said second tube about the outside of said Brewster window for protecting said Brewster window from the discharge through said second gas, said protective sleeve member including an axially disposed aperture having a diameter equal or smaller than any of said capillaries, said aperture being oriented to permit light to pass from the bore of said first capillary through said Brewster window to the bore of said second capillary without obstruction.

6. The gas laser defined in claim 4, further including a laser power supply coupled between anode and cold cathode of said first tube for establishing said given discharge through said first gas, and modulation signal means coupled between said second anode and said second cold cathode of said second tube for establishing said discharge through said second gas and controlling the intensity thereof.

7. The gas laser defined in claim 6, wherein the amplitude of the modulation signal from said modulation signal means has minimum and maximum values, respectively, for controlling the intensity of said discharge through said second gas over a range which continuously extends from a first intensity at which said discharge is substantially transparent to wave energy at said given wavelength to a second intensity at which said discharge is substantially opaque to wave energy at said given wavelength.

8. The gas laser defined in claim 7, wherein said first gas is a mixture of helium and neon, wherein said second gas is substantially entirely neon at a pressure in the order of 10 Torr, and wherein said first intensity is in the order of one milliampere and said second intensity is in the order of 8 milliamperes.

* * * * *

Disclaimer 3,760,296.—*Karl Gerhard Hernqvist*, Princeton, N.J. INTERNALLY-MODULATED GAS LASER. Patent dated Sept. 18, 1973. Disclaimer filed Jan. 26, 1976, by the assignee, *RCA Corporation*.

Hereby enters this disclaimer to claims 1 and 2 of said patent.

[*Official Gazette March 30, 1976.*]

UNITED STATES PATENT OFFICE
CERTIFICATE OF CORRECTION

PATENT NO. : 3,760,296
DATED : September 18, 1973
INVENTOR(S) : Karl Gerhard Hernqvist It is certified that error appears in the above-identified patent and that said Letters Patent are hereby corrected as shown below:

Claim 5, line 1, after "Claim," change "1" to --4--.

Signed and Sealed this twenty-fifth Day of May 1976

[SEAL]

Attest:

RUTH C. MASON
Attesting Officer

C. MARSHALL DANN
Commissioner of Patents and Trademarks